United States Patent Office 2,857,367
Patented Oct. 21, 1958

2,857,367

POLYMERIZATION PROCESS UTILIZING DEXTRAN AS A PRIMARY DISPERSING AGENT

James J. Kearney, Fairport Harbor, Ohio, assignor to Diamond Alkali Company, Cleveland, Ohio, a corporation of Delaware No Drawing. Application June 10, 1954
Serial No. 435,935

7 Claims. (Cl. 260—92.8)

This invention relates to the polymerization of ethylenically unsaturated materials, and more particularly relates to the production of resins comprising polyvinyl chloride.

There are four general methods of polymerization employed in industry, the particular method used depending on economic considerations, as well as the ultimate use to which the polymer is put. These four methods are bulk polymerization, solution polymerization, emulsion polymerization, and suspension polymerization.

Bulk polymerization is accomplished by subjecting a pure liquid or gaseous monomer to polymerizing conditions. Although a pure polymer is obtained, difficulties are encountered in bulk polymerization. For example, air bubbles and other imperfections often find their way into the polymer product, thereby producing a haze in otherwise clear materials. Equally disadvantageous are the problems of molecular weight control and dissipation of the heat of reaction, matters that become increasingly difficult as the polymerization proceeds and the reaction mass becomes more viscous.

The disadvantages of a continuous and elaborate heat control system, which is generally necessary in bulk polymerization, are substantially completely overcome by solution polymerization, wherein the monomer is dissolved in a solvent and the polymerization is carried out in solution, the polymer being separated by precipitation. The heat generated during the reaction is dispersed throughout the entire solvent-solute system, thereby reducing or eliminating overheating. However, not only are costly amounts of solvent required, but also the reaction rate is relatively slow and the polymer obtained by solution polymerization has a relatively low average molecular weight and cannot be completely freed of solvent.

The disadvantage encountered in the two prior methods, i. e., difficult heat control in bulk polymerization and low molecular weight products, slow reaction, and presence of solvent in solution polymerization polymer, are substantially overcome by polymerization in an emulsified phase, the so-called "emulsion polymerization." This type of polymerization requires a number of ingredients for successful operation, generally including an emulsifying agent, protective colloids and/or buffers. While emulsion polymerization overcomes many of the difficulties in the aforementioned types of polymerization, there remains the problem of obtaining a substantially pure product free from emulsifying agents and other additives necessary to maintain the emulsion, or latex. Hence, the final product of emulsion polymerization contains impurities which render it unsatisfactory for a number of important applications. For example, it is almost impossible to prepare a material of good clarity such as is necessary for use in forming films and sheets. Moreover, the poor dielectric qualities of the product render it unsatisfactory in many electrical applications, even when great care is exercised in washing the product.

The remaining type of polymerization is suspension polymerization, improvements in which the present invention is concerned. Suspension polymerization is also known as "granular polymerization" or "pearl polymerization," the three terms being synonymous and in contrast to the prior discussed methods of polymerization. The practice of suspension polymerization is now well-known to involve suspending monomer in water or other non-solvent and, while so suspended, effecting polymerization. Heat and catalysts are employed as polymerization aids and the suspension is maintained during the course of the reaction by agitation and generally by stabilizing the system with a so-called "suspension stabilizer." When the polymerization is complete, the polymer is recovered in particle or granular form by filtration or centrifugation without the aid of any additional specific means. The product is thereafter washed and dried and is ready for the market.

There are many variations of the granular polymerization method generally described above. These variations appear in the art because of the specific difficulties that are encountered in its practice. The simple change from emulsion polymerization to granular polymerization does not lead to problem-free operation. In fact, some of the difficulties found in emulsion polymerization are also experienced in granular polymerization, notably, the production of a stock material which, when processed to form products, contain what is known to the art as "fisheyes." In the production of a high-quality general-purpose polymeric material, it is perhaps misdescriptive to refer to any particular disadvantage as being most important. However, if any single one is most important, it is poor colloidability, as evidenced by the formation of fisheyes. This is because of the fact that all products formed from fisheye-producing polymeric stock are inferior in quality in several important functional aspects, depending upon the number and size of fisheyes present.

Fisheyes may be visualized as small blotches, actually having the appearance of the eyes of fish, in the final plasticized polymeric product. They are believed to result from the failure of some of the individual particles of the polymer stock to associate with the plasticizer. Thus, as to substance, they are merely small particles of polymer surrounded by relatively large seas of plasticizer. Since the plasticized material is intended to be homogeneous, fisheyes indicate poor homogeneity and are imperfections in the final product. A relatively small number of fisheyes can be tolerated in the final product; in fact, it appears impossible to eliminate them completely by any process. The seriousness of their presence in large numbers may be indicated by the following comments which refer to the undesirable effects that they have.

Excellent transparency of polyvinyl chloride in some applications, for example, sheets and films, is an absolute necessity, both functionally and appearance-wise. Where such products contain a substantial number of fisheyes, they are not clear and transparent; instead, they present a hazy appearance and may be degraded in clarity to the point of mere translucency. As noted above, dielectric strength in some electrical applications is important and where the product contains many fisheyes, it is unsuitable for these uses because of the reduced dielectric strength. Additionally, fisheyes result in the formation of a rough, uneven surface which cannot be smoothed. Products containing fisheyes are low in structural strength; especially the tear resistance of polyvinyl chloride sheets is seriously impaired. Fisheyes are undesirable for still other reasons which need not be mentioned but which are appreciated by those skilled in the art.

While, as noted above, the polymeric mass that is produced by a properly managed granular polymerization method may be quite easily and quickly washed free of impurities and is readily dried, it is extremely difficult to control the particle size of the granular mass that is formed, whereby such ease of washing and drying is attained. From the standpoint of operating efficiency, and thus the commercial advantage in low production cost that the granular polymerization process affords, the problem of particle size is frequently as serious as the problem of fisheyes.

It will be recalled from the foregoing paragraphs that the polymerized product must be separated from the aqueous medium. This may be accomplished by usual filtration or centrifuging methods provided that the product is within a suitable particle size range. If the particle size is too small, separation will be difficult and extremely slow and, in fact, may be impossible in the practical sense. A mass of small particles holds the occluded suspending medium and prevents its release from the mass. Also, the particles themselves may pass through the filter along with the liquid. On the other hand, if the particles are too large, or if the particles are not of a uniform desired size, serious obstacles are encountered in processing the polymer to its final product stage. Because of the processing requirements for handling larger particles, an inferior product results.

For example, in processing polyvinyl chloride to sheet form, it is customary to admix with it a plasticizer and deliver it to a milling machine such as the well-known roll mill which works the mixtures to homogeneity. It has been found that polyvinyl chloride deteriorates quite markedly during this processing stage if it is permitted to remain in contact with the hot rolls beyond a limited time. Large particles of polymer must be worked longer than small or medium particles and thus require a greater residence time in the mill. Accordingly, products formed from large particle size polymer tend to suffer in their physical properties, such as color and heat stability. A mass of non-uniform size, that is to say, one containing particles of acceptable size and particles of a size that are regarded normally as too large, presents a similar difficulty because the polymer must remain upon the mill until all particles have been equally plasticized in order to obtain a homogeneous product.

Various attempts have been made to explain the reason for the formation of large globules or agglomerates of the polymer. It has been reported that during the polymerization reaction, the mass passes through a sticky, tacky state which is not broken up completely in the succeeding phase of the reaction and that violent agitation seems only to increase the tendency toward agglomeration. Also, it is reported that the reaction rate and the temperature in the reaction zone is thought to be responsible for the problem. These possibilities need not be denied here as they may be entirely valid assumptions when considered in the light of the particular process in which they originate. However, it is suggested herein that the proper approach to solving the problem of uniform particle size resides in the basic suspension system itself, and that, if the suspension system is properly established, a preferred particle size can be obtained, and other conditions, such as temperature, reaction rate and agitation exhibit a reduced influence upon particle size.

It is, therefore, a principal object of the present invention to provide an improved suspension system during polymerization to produce a polymer having enhanced processability and uniformity.

A further object of the invention is the provision of an improved suspending agent for use in suspension polymerization.

These and other objects and advantages will appear more fully from the following description of the invention.

The present invention broadly comprises the suspension polymerization of an unsaturated monomer utilizing as a suspension system dextran either alone or as a primary dispersant in combination with certain secondary dispersants. Hence, as used in the specification and claims, the expressions "suspension stabilizer" or "suspension agent" are intended to include both the use of dextran alone, and also its use in combination with one or more secondary dispersants.

Typical but not limitative of secondary dispersants for use in accordance with the practice of the present invention are water-soluble, or water-dispersible, substances selected from the following materials: formaldehyde condensation resins, such as phenol formaldehyde, urea formaldehyde, and melamine formaldehyde resins; non-ionic materials, including polyethylene glycol esters, glyceryl monoesters, such as glyceryl monolaurate, glyceryl monostearate, glyceryl monooleate, and glyceryl monoricinoleate, alkyl aryl polyether alcohols, such as alkyl phenoxy polyoxyethylene ethanols; sorbitan fatty acid esters and derivatives; polyoxyethylene sorbitan fatty acid esters and derivatives, such as polyoxyethylene sorbitan monolaurate, polyoxyethylene sorbitan monopalmitate, polyoxyethylene sorbitan tristearate; polyvinyl alkyl ethers and their copolymers with maleic anhydride, as well as derivatives of such ethers and copolymers; polyvinyl pyrrolidones; and glyceryl phthalic alkyd resins and derivatives.

In addition, in certain instances, it is possible to employ as secondary dispersants such materials as gelatin, polyvinyl alcohols, methyl cellulose, polyacrylamides, and polyacrylic acid resins.

Dextran is a carbohydrate material having the general formula $$(C_6H_{10}O_5)n$$

where $n$ is greater than zero. Dextran is produced by certain bacteria from molasses, beet juice, milk, or wine. Illustrative of suitable commercially available dextrans are those obtained from the R. K. Laros Co. having approximate molecular weights of 18,000, 74,000, 228,000, and 7,400,000.

While the process by which polyvinyl chloride resins may be prepared according to this invention involves the correlation of a number of reaction conditions, the process, in the main, is not difficult to manage as a sustained commercial operation. It is necessary only to observe with care the various conditions that are described herein whereby, it is believed, a product is obtained which is equal to, if not superior to, any known commercial polyvinyl chloride product. The reaction time is not inordinately long. It requires less than about 15 hours under preferred conditions and, if desired, can be speeded up considerably.

In order that those interested in preparing resinous materials in accordance with this invention may do so with facility, it is desired to make specific reference to the several variables which are involved, and, further, to call attention to certain precautions that have been found to contribute, at least in a small way, to the overall success of the process.

It will be appreciated that the conditions hereinafter referred to may be varied from a particular suggested optimum figure either because of the success of the process does not depend upon the maintenance of the condition with such exactness, or because the alteration of a particular condition may be compensated for by the alteration of another condition operating concurrently. Again, it should be noted that specific conditions set forth hereinafter relate particularly to the production of polyvinyl chloride; therefore, where other resinous materials are produced, it may be found that slightly modified conditions are desirable.

As to the precautions, some of them are well-known in the art and while the complete success of the process is not dependent upon the observance of the precautions, and the invention is not limited to the application of such precautions, their observance is recommended, especially in the production of polyvinyl chloride whereby, in some cases, a better product is produced or a particular difficulty is reduced in its magnitude.

The suspension stabilizer content may, of course, be varied somewhat in different applications. However, it is generally desirable to employ the dextran in a small but effective amount, typically within the range from approximately 0.025% to 1.0% by weight of the monomer present. When a secondary disperant is employed, its concentration generally also may be varied within the range of about 0.025% to 1.0% by weight of the monomer present.

The reaction temperatures herein suggested do not appear to have any significant effect upon either the particle size or the number of fisheyes that may result in a finally formed product. However, as is well known, high temperature generally results in the production of a polymeric material of reduced strength. Accordingly, the temperature should be maintained at a level consistent with good molecular weight and adequate speed of the reaction. For example, lauryl peroxide is an effective catalyst in the polymerization of vinyl chloride and excellent results are thereby obtained by operating at a temperature of about 120° to 130° F. This temperature range is in most instances preferred. However, the reaction proceeds with good order at from about 105° to 160° F., although about 115° to 140° F. is more suitable, since at about 105° F. the reaction is slow, and at temperatures of about 160° F. and above some undesirable fusion of particles may take place.

The invention is not restricted to any particular catalyst, since the reaction conditions suggested do not interfere with the activity of the catalyst and no well-recognized catalyst is known which defeats the ends of the invention, it being preferred, of course, to employ a catalyst soluble in the monomer to be polymerized. Accordingly, for example, there may be employed any of the well-known catalysts, such as benzoyl peroxide, lauryl peroxide, dicaproyl peroxide, acetyl benzoyl peroxide, diacetyl peroxide, p-tertiary-butyl perbenzoate, tertiary butyl perlaurate, di-tertiary-butyl peroxide; organic azo compounds, such as alpha, alpha'-azodiisobutyronitrile and dimethyl alpha, alpha'-azodiisobutyrate. Each catalyst will have its optimum concentration, that is to say, a concentration sufficient to effect a substantially complete polymerization at a suitable reaction rate. The reaction proceeds without difficulty or disadvantage in the presence of any of the well-known polymerization catalysts with concentrations of 0.10–0.40% by weight of the monomer. However, catalyst concentrations of about 0.15–0.30% are more suitable because of improved reaction rate and, generally, about 0.20–0.25% by weight of monomer is preferred. While the effects of excessive catalyst concentration are not especially notable, it has been observed that an excess of catalyst tends to produce a material of reduced heat stability, and one having slightly reduced strength characteristics which are apparently due to a reduction in molecular weight. In selecting the catalyst, especially if the end product is to be used in electrical applications where dielectric strength is a factor, care should be taken to select a catalyst which will not be detrimental in this respect and, further, it should not exert an emulsifying effect. The peroxide catalysts are preferred, lauryl peroxide being a suitable and especially effective catalyst.

The method by which the reaction is initiated may exert an influence upon product quality. It will be understood, however, that no particular start-up method is critical to the ends of the invention; rather, the preferred procedure seems to serve to enhance the final result.

The reaction may be carried to 100% conversion, or substantially so, if desired, but may also be terminated short of completion as desired or as convenience of plant conditions may dictate. When the reaction is complete to the desired extent, the polymer may be separated from the remaining monomer and reaction medium by known means.

Raw material purity and contamination are quite important, since important properties of the product may be adversely affected thereby. In particular, aldehydes, phenols, acetylinic compounds, iron and sodium salts, calcium, soaps, fatty acids and the like may be in the raw material or enter the system from an outside source and precautions should be taken to insure reasonable to maximum purity at all times.

Generally, it is preferred to conduct the polymerization at a pH of about 7.0. However, in some instances it is desirable to operate in an acid medium. Various acids may be utilized to effect the desired pH value, the prominent controlling factor in its selection being that it should not impair dielectric properties. Thus, acids such as sulfuric, hydrochloric, phosphoric and acetic are suitable, phosphoric acid being preferred.

The water-monomer ratio in the system is not critical. This ratio may vary from about 1.50–4:1. More suitable, however, due to decrease in volume to be handled, is a water-monomer ratio of about 1.90–3:1, the preferred ratio being about 1.90–2.25:1. All of these ratios are volume ratios.

In order that those skilled in the art may better understand the invention and a method by which the same may be carried into effect, the following specific examples are offered:

EXAMPLE I

Into a bottle reactor containing the desired amount of water, i. e., 2:1 water-monomer ratio, is introduced lauryl peroxide as a polymerization catalyst. The desired amount of dextran is then weighed into the bottle reactor containing the catalyst and the distilled water.

The amounts of peroxide and dextran are dictated by the amount of monomer to be used and are indicated in Table I. The resultant water-peroxide-suspension agent mixture is then cooled until ice crystals are observed to prevent decomposition of the peroxide. The desired amount of distilled vinyl chloride monomer is then added, preferably in a slight excess. The excess monomer is allowed to evaporate at room temperature, thereby purging the bottle reactor of air. The bottle is then capped and placed in a temperature controlled polymerizer, where it is maintained for 12 hours at a temperature of about 122° F. with constant agitation. At the end of this period, the bottle is removed and the polymer examined. The results of a series of such runs are shown in Table I.

Table I.—*Vinyl chloride polymerization dextran as a suspension stabilizer*

[2:1 water-monomer ratio, 0.30% lauryl peroxide catalyst 15 hours' reaction at 122° F. with continuous agitation]

| Run No. | Suspending Agent | | Conversion to Polymer, Percent | Bulk Density, gms./cc. |
|---|---|---|---|---|
| | Molecular Wgt. | Concentration, Wgt. Percent of Monomer | | |
| 1 | 74,000 | 0.30 | 96.3 | 0.42 |
| 2 | 74,000 | 0.50 | 96.3 | 0.41 |
| 3 | 74,000 | 0.70 | 96.3 | 0.43 |
| 4 | 228,000 | 0.10 | 96.7 | 0.45 |
| 5 | 228,000 | 0.30 | 92.7 | 0.40 |
| 6 | 228,000 | 0.70 | 96.3 | 0.45 |
| 7 | 7,400,000 | 0.10 | 91.1 | 0.40 |
| 8 | 7,400,000 | 0.50 | 95.7 | 0.40 |

EXAMPLE II

FORMULATION

The following approximate quantities of materials are provided: about 33.3 gallons of deionized, deaerated water, about 16.7 gallons of purified vinyl chloride, about 0.25% (by weight of monomer) of lauryl peroxide, and about 0.30% (by weight of monomer) of dextran (molecular weight 74,000).

PROCEDURE

About 31 gallons of deaerated water are charged to a glass-lined jacketed reactor, the water being at room temperature. A vacuum of about 27 inches of mercury is pulled on the reactor and vinyl chloride monomer introduced to the reactor to bring it back to atmospheric pressure. The vacuum treatment is repeated and more vinyl chloride monomer is introduced to the reactor. The suspension stabilizer is added and the system is now agitated for a period of about 30 minutes to secure good dispersion. The catalyst is then charged, followed by charging of the monomer. All valves are then closed, the agitator started to turn at about 250 R. P. M., and the reactor is brought to approximately 125° F. over about the next two hours and there maintained for 12 hours. Cold water is then delivered to the jacket and the system is cooled rapidly to about room temperature. The charge is then blown to a centrifuge and there spun as dry as possible, after which it is washed with about four displacements of water. The mass is then again spun dry, after which it is delivered to trays for final drying. It is then a finished material, ready for processing.

EXAMPLE III

FORMULATION

The following quantities of materials are provided: 33 gallons of deionized deaerated water, 16.7 gallons of purified vinyl chloride monomer, 0.25% (by weight of monomer) of lauryl peroxide, 0.3% (by weight of monomer) of dextran (molecular weight 18,000), and 0.2% (by weight of monomer) of gelatin.

PROCEDURE

The procedure described in Example I is followed in this example and a product comparable in substantially all respects is obtained.

The polymer particles obtained in accordance with the practice of the present invention are characterized by highly porous structure which enhances their ability to accept plasticizer upon further processing. Accordingly, the products formed from the polymer are entirely free of the disadvantages mentioned hereinbefore relating to problems that are encountered because of excessive quantities of particles that are too large or too small.

The polymer has excellent dry-blending qualities. For example, it may be mixed with any of the well-known plasticizers, both monomeric and polymeric types, without any tendency to become sticky or syrupy. Examples of such plasticizers are dioctyl phthalate and the polyesters formed by condensation of polyhydric alcohols and dibasic acids, as well as epoxidized unsaturated polyesters.

Products which are formed from granular polymeric material produced as in the above example exhibit outstanding properties in all respects. Because of the substantial absence of large fisheyes and the very small quantity of small fisheyes, sheets, films, and other finished products are unusually strong. Likewise, such products are of excellent clarity.

While the invention generally has been described with particular reference to the production of polyvinyl chloride, it may be employed also in the polymerization of other unsaturated monomers, and in the production of polyvinyl chloride copolymers, especially copolymers in which vinyl chloride constitutes at least 85% of the mixture of monomeric materials.

Thus, the process of the invention is applicable to the polymerization of other unsaturated monomeric material, such as vinyl esters of carboxylic acids, for example, vinyl stearate, vinyl acetate, vinyl propionate, vinyl butyrate, vinyl benzoate; esters of unsaturated acids, for example, methyl acrylate, ethyl acrylate, butyl acrylate, allyl acrylate, and the corresponding esters of methacrylic acid; vinyl aromatic compounds, for example, styrene, orthochlorostyrene, parachlorostyrene, 2,5-dichlorostyrene, 2,4-dichlorostyrene, paraethyl styrene, divinyl benzene, vinyl naphthalene, alpha-methyl styrene; dienes, such as butadiene, chloroprene; amides, such as acrylic acid amide, acrylic acid anilide; nitriles, such as acrylic acid nitrile; esters of a,β-unsaturated carboxylic acids, for example, the methyl, ethyl, propyl, butyl, amyl, hexyl, heptyl, octyl, allyl, methallyl and phenyl esters of maleic, crotonic, itaconic, fumaric acids and the like. The process of the invention is also applicable to vinyl halides broadly, e. g., vinyl chloride, vinyl bromide, etc. The method also is applicable to processes wherein vinyl chloride is polymerized with unsaturated monomeric materials as typified by the foregoing materials.

While there have been described various embodiments of the invention, the methods described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The process of producing high-quality polymeric material which comprises dispersing a polymerizable monoethylenic monomer in water with the aid of dextran in an amount within the range from about 0.025% to 1.0% by weight of the monomer and effecting polymerization of said monomer while so suspended.

2. The process of producing high-quality polymeric material, said process comprising dispersing polymerizable monoethylenic monomeric mixture containing at least 85% by weight of vinyl chloride in water with the aid of up to about 1.0% of dextran based on the weight of monomeric mixture and polymerizing said monomeric mixture with the aid of heat and a polymerization catalyst.

3. The process of producing high-quality polymeric material, said process comprising dispersing a polymerizable monoethylenic monomer in water with the aid of dextran in an amount of about 0.025% to about 1.0% by weight of the monomer as a primary dispersant, in combination with about 0.025% to about 1.0% by weight of monomer of a secondary dispersant selected from the group consisting of formaldehyde condensation resins, polyethylene glycol esters, glyceryl monoesters, alkyl aryl polyether alcohols, sorbitan fatty acid esters, polyoxyethylene sorbitan fatty acid esters, polyvinyl alkyl ethers, polyvinyl pyrrolidones, and glyceryl phthalic alkyd resins and polymerizing said monomer with the aid of heat and a polymerization catalyst.

4. A suspension polymerization process for producing a high-quality polymeric material containing at least 85% by weight of polyvinyl chloride, said process comprising dispersing a vinyl chloride-containing monoethylenic monomeric mixture and a peroxy polymerization catalyst in water, the proportions of said monomeric mixture to water being within the range from about 1.5–4.0:1, with the aid of 0.025 to 1% by weight of dextran based on the weight of said monomeric mixture and while so dispersed heating the monomeric mixture-water catalyst suspension with continuous agitation to a temperature within the range from 115° to 140° F. to effect polymerization.

5. The process according to claim 4 wherein the polymerization catalyst is a monomeric mixture-soluble peroxy compound.

6. The process according to claim 4 wherein the monomer consists essentially of vinyl chloride monomer.

7. The method according to claim 4 wherein there also is added a secondary dispersant selected from the group consisting of formaldehyde condensation resins, polyethylene glycol esters, glyceryl monoesters, alkyl aryl polyether alcohols, sorbitan fatty acid esters, polyoxyethylene sorbitan fatty acid esters, polyvinyl alkyl ethers, polyvinyl pyrrolidones, and glyceryl phthalic alkyd resins in an amount within the range from about 0.025 to 1.0% by weight of monomeric mixture.

References Cited in the file of this patent

UNITED STATES PATENTS

| 2,440,808 | Neher et al. | May 4, 1948 |
| 2,473,929 | Wilson | June 21, 1949 |
| 2,666,042 | Nozaki | Jan. 12, 1954 |

OTHER REFERENCES

"Advances in Carbohydrate Chem.," vol. 4, pub. by Academic Press Inc., New York, N. Y., 1949, p. 333.

"Dextran—A Selected Bibliography," pub. by Northern Regional Lab., Peoria, Ill., June 1952, p. 3.

UNITED STATES PATENT OFFICE
CERTIFICATE OF CORRECTION

Patent No. 2,857,367                                    October 21, 1958

James J. Kearney

It is hereby certified that error appears in the printed specification of the above numbered patent requiring correction and that the said Letters Patent should read as corrected below.

Column 1, line 49, for "disadvantage" read -- disadvantages --; column 5, line 2, for "diffierent" read -- different --; column 9, lines 1 and 2, for "monomer" read -- monomeric mixture --.

Signed and sealed this 10th day of February 1959.

(SEAL)

Attest:

KARL H. AXLINE

Attesting Officer

ROBERT C. WATSON

Commissioner of Patents